United States Patent
Arimilli et al.

(10) Patent No.: US 6,779,086 B2
(45) Date of Patent: *Aug. 17, 2004

(54) SYMMETRIC MULTIPROCESSOR SYSTEMS WITH AN INDEPENDENT SUPER-COHERENT CACHE DIRECTORY

(75) Inventors: Ravi Kumar Arimilli, Austin, TX (US); Guy Lynn Guthrie, Austin, TX (US); William J. Starke, Round Rock, TX (US); Derek Edward Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 350 days.

This patent is subject to a terminal disclaimer.

(21) Appl. No.: 09/978,363

(22) Filed: Oct. 16, 2001

(65) Prior Publication Data

US 2003/0093624 A1 May 15, 2003

(51) Int. Cl.[7] ................................................ G06F 12/00
(52) U.S. Cl. ...................... 711/141; 711/118; 711/142; 711/143; 711/144; 711/145; 711/146
(58) Field of Search ........................... 711/118, 141–146

(56) References Cited

U.S. PATENT DOCUMENTS

| | | | | |
|---|---|---|---|---|
| 5,553,266 A | * | 9/1996 | Metzger et al. | 711/144 |
| 5,572,702 A | * | 11/1996 | Sarangdhar et al. | 711/146 |
| 5,765,208 A | * | 6/1998 | Nelson et al. | 711/204 |
| 6,240,491 B1 | * | 5/2001 | Abily et al. | 711/144 |
| 6,477,620 B1 | * | 11/2002 | Bauman et al. | 711/118 |

* cited by examiner

Primary Examiner—T Nguyen
(74) Attorney, Agent, or Firm—Casimer K. Salys; Dillon & Yudell LLP

(57) ABSTRACT

A multiprocessor data processing system comprising, in addition to a first and second processor having an respective first and second cache and a main cache directory affiliated with the first processor's cache, a secondary cache directory of the first cache, which contains a subset of cache line addresses from the main cache directory corresponding to cache lines that are in a first or second coherency state, where the second coherency state indicates to the first processor that requests issued from the first processor for a cache line whose address is within the secondary directory should utilize super-coherent data currently available in the first cache and should not be issued on the system interconnect. Additionally, the cache controller logic includes a clear on barrier flag (COBF) associated with the secondary directory, which is set whenever an operation of the first processor is issued to said system interconnect. If a barrier instruction is received by the first processor while the COBF is set, the contents of the secondary directory are immediately flushed and the cache lines are tagged with an invalid state.

12 Claims, 7 Drawing Sheets

0: Always read valid data
1: Read previously coherent data

|  Valid Bit | Address Tag | P0 | P1 | P2 | P3 |  |
|---|---|---|---|---|---|---|
| 1/0 | Address Tag | 0 | 0 | 0 | 0 | All Z1 State |
|  |  |  | ⋮ |  |  |  |
|  |  | 1 | 0 | 1 | 0 | P0 & P2 in Z2 State |
|  |  |  | ⋮ |  |  |  |
|  |  | 0 | 0 | 1 | 1 | P2 & P3 in Z2 State |

500

SYMMETRIC MULTIPROCESSOR SYSTEMS WITH AN INDEPENDENT SUPER-COHERENT CACHE DIRECTORY

RELATED APPLICATIONS

The present invention is related to the subject matter of the following commonly assigned, copending U.S. patent applications filed concurrently herewith: Ser. No. 09/978,355, entitled "Super-Coherent Multiprocessor System Bus Protocols"; Ser. No. 09/978,362, entitled "High Performance Symmetric Multiprocessing Systems Via Super-coherent Data Mechanisms"; Ser. No. 09/978,361, entitled "Dynamic Hardware and Software Performance Optimizations For Super-Coherent SMP Systems"; and Ser. No. 09/978,353, entitled "Super-Coherent Data Mechanisms for Shared Caches In a Multiprocessing System." The content of the above referenced related applications is incorporated herein by reference.

BACKGROUND OF THE INVENTION

1. Technical Field

The present invention relates generally to data processing systems and, in particular, to processor-cache operations within a multiprocessor data-processing system. Still more particularly, the present invention relates to improved SMP system performance via a secondary cache directory to support super-coherent cache states of an enhanced coherency protocol.

2. Description of the Prior Art

A data-processing system typically includes a processor coupled to a variety of storage devices arranged in a hierarchical manner. In addition to a main memory, a commonly employed storage device in the hierarchy includes a high-speed memory known as a cache memory (or cache). A cache speeds up the apparent access times of the relatively slower main memory by retaining the data or instructions that the processor is most likely to access again, and making the data or instructions available to the processor at a much lower latency. As such, caches enable relatively fast access to a subset of data and/or instructions that were recently transferred from the main memory to the processor, and thus improves the overall speed of the data-processing system.

Most contemporary high-performance data processing system architectures include multiple levels of cache memory within the memory hierarchy. Cache levels are typically employed in progressively longer access latencies. Smaller, faster caches are employed at levels within the storage hierarchy closer to the processor (or processors) while larger, slower caches are employed at levels closer to system memory.

In a conventional symmetric multiprocessor (SMP) data processing system, all of the processors are generally identical, insofar as the processors all utilize common instruction sets and communication protocols, have similar hardware architectures, and are generally provided with similar memory hierarchies. For example, a conventional SMP data processing system, as illustrated in FIG. 1A, may comprise a system memory 107, a plurality of processing elements 101A–101D that each include a processor and one (or more) level(s) of cache memory 103A–103D, and a system bus 105 coupling the processing elements (processors) 101A–101D to each other and to the system memory 107. Many such systems include at least one level of cache memory shared between two or more processors. Additionally, a "shared" cache line 109 may exist in each cache memory 103A–103D. To obtain valid execution results in a SMP data processing system, it is important to maintain a coherent memory hierarchy, that is, to provide a single view of the contents of memory to all of the processors.

A coherent memory hierarchy is maintained through the use of a selected memory coherency protocol, such as the MESI protocol. In the MESI protocol, an indication of a coherency state is stored in association with each cache line of at least all upper level (cache) memories. Each coherency cache line can have one of four states, "M" (Modified), "E" (Exclusive), "S" (Shared) or "I" (Invalid), which can be encoded by two bits in the cache directory.

FIG. 2 illustrates the MESI protocol and its state transition features. Under the MESI protocol, each cache entry (e.g., a 32-byte sector) has two additional bits which indicate the state of the entry, out of the four possible states. Depending upon the initial state of the entry and the type of access sought by the requesting processor, the state may be changed, and a particular state is set for the entry in the requesting processor's cache. For example, when data in a cache line is in the Modified (M) state, the addressed data is valid only in the cache having the modified cache line, and the modified value has not been written back to system memory. When a cache line is in the Exclusive state, the corresponding data is present only in the noted cache, and is consistent with system memory. If a cache line is in the Shared state, the data is valid in that cache and in at least one other cache, with all of the shared data being consistent with system memory. Finally, when a cache line is in the Invalid state, the addressed data is not resident in the cache. As seen in FIG. 2 and known in the art, the state of the cache line transitions between the various MESI states depending upon particular bus or processor transactions.

There are a number of protocols and techniques for achieving cache coherence that are known to those skilled in the art. At the heart of all these mechanisms for maintaining coherency is the requirement that the protocols allow only one processor to have a "permission" (or lock) that allows a write to a given memory location (cache block) at any given point in time. As a consequence of this requirement, whenever a processor (or processing component) attempts to write to a memory location, the processor must first inform all other processing components of the processor's desire to write into a cache line and invalidate all other processing components' cache line (to the same address).

To implement cache coherency in a system, the processors communicate over a common generalized interconnect (i.e., system bus 105). The processors pass messages over the interconnect indicating their desire to read or write memory locations. When an operation is placed on the interconnect, all of the other processors "snoop" (monitor) this operation and decide if the state of their caches can allow the requested operation to proceed and, if so, under what conditions. There are several bus transactions that require snooping and follow-up action to honor the bus transactions and maintain memory coherency. The snooping operation is triggered by the receipt of a qualified snoop request, generated by the assertion of certain bus signals. Instruction processing is interrupted only when a snoop hit occurs and the snoop state machine determines that an additional cache snoop is required to resolve the coherency of the offended sector.

This communication is necessary because, in systems with caches, the most recent valid copy of a given block of memory may have moved from the system memory to one or more of the caches in the system (as mentioned above).

If a processor attempts to access a memory location not present within its cache hierarchy, the correct version of the block, which contains the actual (current) value for the memory location, may either be in the system memory or in one of more of the caches in another processing unit. If the correct version is in one or more of the other caches in the system, it is necessary to obtain the correct value from the cache(s) in the system instead of system memory.

For example, with reference to FIG. 1A, a read transaction that is issued against cache line 109 by P0 (processor 101A) and subsequent coherency operations would evolve as follows. P0 first searches its own L1 cache 103A. If the cache line is not present in the L1 cache 103A, the request is forwarded to the L2 cache, then the L3 cache and so on until the request gets is presented on the generalized interconnect (system bus 105) to be serviced by one of the other processors or the system memory. Once an operation has been placed on the generalized interconnect, all other processing units P1–P3 snoop the operation and determine if the block is present in their caches. If a given processing unit has the block of data requested by P0 in its L1 cache, and that data is modified, by the principle of inclusion the L2 cache and any lower level caches also have copies of the block (however, their copies are stale, since the copy in the processor's cache is modified). Therefore, when the lowest level cache (e.g., L3) of the processing unit snoops the read instruction, it will determine that the block requested is present and modified in a higher level cache. When this occurs, the L3 cache places a message on the generalized interconnect informing the processing unit that the processing unit must "retry" its operation again at a later time, because the actual value of the memory location is in the L1 cache at the top of the memory hierarchy and must be retrieved to make it available to service the read request of the initiating processing unit, P0. (In some systems, "retry" bus operation may be replace by a data interaction operation.

Once the request from an initiating processing unit has been retried, the lower level cache begins a process to retrieve the modified data from the L1 cache and make it available. P0 eventually presents the read request on the generalized interconnect again. At this point, however, the modified data has been retrieved from the L1 cache of a processing unit and the read request from the initiating processor will be satisfied.

The essential point is that, when a processor wishes to read or write a block, it must communicate that desire with the other processing units in the system in order to maintain cache coherence. To achieve this, the cache coherence protocol associates with each block in each level of the cache hierarchy, a status indicator indicating the current "state" of the block. The state information is used to allow certain optimizations in the coherency protocol that reduce message traffic on the generalized interconnect and the inter-cache connections.

As one example of this mechanism, when a processing unit executes a read, the processing unit receives a message indicating whether or not the read must be retried later. If the read operation is not retried, the message usually includes information allowing the processing unit to determine if any other processing unit also has a still active copy of the block (this is accomplished by having the other lowest level caches give a "shared" or "not shared" indication for any read that do not retry). Therefore, a processing unit can determine whether any other processor in the system has a copy of the block. If no other processing unit has an active copy of the block, the reading processing unit marks the state of the block as "exclusive". If a block is marked exclusive it is permissible to allow the processing unit to later write the block without first communicating with other processing units in the system because no other processing unit has a copy of the block. Therefore, it is possible for a processor to read or write a location without first communicating this intention on the interconnection, but only where the coherency protocol rules are met.

The foregoing cache coherency technique is implemented in the prior art MESI protocol and illustrated in FIG. 2 and described above. A cache line can become Invalid (e.g., from the Shared state) if the cache snoops an operation from a different processor indicating that the value held in the cache block is to be modified by the other processor, such as by snooping a Read-With-Intent-To-Modify (RWITM) operation.

Some processor architectures, including the PowerPC™ processor, allow the execution of one or more special operations, other than the RWITM operation, when a processor wants to claim a memory block for a future store instruction (modifying the block). The "DClaim" operation is one example. The DClaim operation is used in lieu of the RWITM bus transaction when a valid value for the subject block is already held in the same processor's cache, e.g., in a Shared state (if the value were currently held in a Modified or Exclusive state, there would be no need to broadcast either a RWITM or DClaim request since the processor would already have exclusive control of the block). The processor may be adapted to execute a DClaim operation after checking to see if the valid value is resident in examining its on-board (L1) cache. If not, the processor can issue a RWITM request, and any lower level cache having the valid value will, upon receiving the RWITM request, convert it into a DClaim operation to be passed to the system bus. The DClaim operation accordingly is an address-only operation since the value does not need to be read (from system memory or any intervening cache). Because of this attribute, the DClaim operation is more efficient than a RWITM operation, which would force the read operation across the system bus. When another cache has the same addressed block in a valid (Shared) state and snoops a DClaim transaction for the block, that other cache switches to its corresponding block to an Invalid state, releasing the block so that the requesting processor can proceed to modify the value. In other words, a DClaim transaction appears just like a RWITM operation from a non-intervening snooper.

One problem with DClaim-type coherency operations is that they occasionally (sometimes frequently) suffer significant performance degradation, since completion of the operation can be delayed by coherency responses from other devices in the memory hierarchy. For example, if several caches of different processing units are previously coherenting a value in Shared states and they snoop a DClaim operation, their respective processors may repeatedly issue retry messages in response to the DClaim snoop (if these processors are currently busy or otherwise unable to handle the snoop, for whatever reason).

With reference again to FIG. 1A, an example of the coherency response to a modification of a shared cache line is provided. FIG. 1A provides a 4-way symmetric multiprocessor system (SMP) 100 in which each of the processor's cache contains a particular cache line 109 in a shared (S) state. In the illustrated SMP 100 of FIG. 1A, processors P0–P3 are depicted, each having an exemplary cache line 109 that is initially in the shared (S) state of the MESI protocol. During operation, P0 issues a store/write operation for cache line 109 (e.g., ST A). Then, P0 acquires a "lock" on the cache line 109. After P0 acquires the lock, the store operation is snooped by the other processors, P1–P3, and each processor changes the coherency state of its local cache line to I and issues a read request for the cache line in P0's cache 103A per the MESI protocol. The store operation causes a DClaim of shared cache line 109, and the DClaim is issued to the system bus. Meanwhile, the read requests are issued on the system bus 109 to acquire the modified cache line. Each of the issuing processors P1–P3 waits for a flag to be set, which indicates that the processor has an opportunity to acquire the lock on the cache line 109 and can get the modified data from P0. All the processors P1–P3 are therefore contending for the same lock on the bus, i.e. all are polling for the same flag. Meanwhile, P0 waits until a "null" response is received in response to the DClaim. If the null response is not received, then the DClaim operation is retried.

When a null response is received, P0's coherency state is changed from S to modified (M). According to current architecture and operational procedures, once the store/write operation is snooped, all the other processors commence issuing reads out to the system bus. Thus the reads are issued in parallel and generally overlap on the system bus. With very large SMPs, e.g. 32-way or 64-way SMPs, the automatic issuance of reads and retries results in the near simultaneous issuing of 32 or 64 read requests to the system bus requiring substantial amounts of system bus bandwidth and utilization of processor resources. Further, because of the large number of requests, significant hardware and software development is required to ensure decent performance and maintain proper cache coherency in these larger systems.

With larger multiprocessing systems, the processors may operate asynchronously, i.e., independent of other processors, in order to achieve higher performance. This adds another level of complexity to the problems of bus utilization for finite amounts of system bus bandwidth to maintain coherency among processor caches.

Returning now to the above-described process, once P0 completes the store operation, P0 releases the lock and P1 acquires the lock from P0 (i.e., P1's flag is set). Read requests from P2 and P3 continue to be retried while P0 intervenes the data to the P1 cache. Then, P0's cache state changes from M to S, and P1's cache state goes from I to S. P1 may then DClaim cache line 109. P1's cache coherency state goes from S to M. Meanwhile, P2 and P3 are still retrying their read A requests until data is intervened to P2. The process then continues with P3 retrying the read A request until data is intervened from P2. P2's cache coherency state goes from S to I then back to S. Likewise, P3's coherency state also goes from S to I then back to S. With large processing groups, the continuing retries of reads on the system bus until lock acquisition occurs and associated coherency state changes in such a serial manner ties up a large amount of processor resources. As described above, with a 32-way SMP, for example, thirty one different lock acquisition processes may be required along with substantial amounts of coherency operations and arbitration for the bus due to multiple retries from each processor attempting to acquire the lock.

Also, the amount of time required to complete the process in such a serial manner may result in the earlier processors, e.g., P0 restarting another store operation before all later processors acquire a lock in response to the previous store operation. Thus, processors are held up in a bottleneck of the system bus and the serialized processing and typically have the previously coherent data for most of the time. Subsequent requests for the cache line by the other processors must wait until the modified data is provided to that processor's cache in the serial manner described. This has the effect of significantly reducing system performance.

The present invention recognizes that it would be desirable to provide a coherency protocol with super-coherent cache states that enable reduced utilization of system bus resources. An improved SMP system architecture in which repetitive system bus operations are substantially eliminated via utilization of super-coherent coherency states and an associated secondary cache directory would be a welcomed improvement. These and other benefits are provided by the invention described herein.

SUMMARY OF THE INVENTION

Disclosed is a cache coherency protocol and operational characteristics of a multiprocessor data processing system that: (1) reduces the number of coherency operations on the system bus of a multiprocessor data processing system in response to the modification of a cache line; and (2) enables utilization of "super-coherent" cached data by a cache coherent microprocessor. Super-coherent cache data is data which had previously been cache coherent, but allowing the processors to use the non-coherent data in a cache coherent programing manner. The invention permits processors to continue utilizing super-coherent data while another processor is actively modifying the data.

The coherency protocol provides two additional coherency states that indicate specific status of super-coherent cached data following a modification of a corresponding cache line in another processor's cache. The first coherency state, Z1, indicates that the corresponding cache line has been modified in another cache and forces the processor to issue a Z1 read of the cache line to the system bus to determine whether or not data in the modified cache line may be immediately acquired. The second coherency state, Z2, indicates that the data in the cache line is super-coherent respective to the modified data in the next cache, but informs the processor that the processor should utilize the super coherent data to complete its processing operations.

Additionally, a set of new snoop responses and supporting logic are provided on the system bus for coherency operations (i.e., Z1 reads snooped on the system bus). The new responses are: "use super-coherent (previous) data" and "use coherent (new) data" and are issued in response to a Z1 read request from a processor attempting to acquire the modified cache line but being able to use the previous data if the modified cache cannot be "quickly" acquired (i.e. no retries).

When one of several possible modifications to the cache line in the first processor is snooped, all other processors sharing that cache line changes the coherency state of their cache line to Z1. Subsequently, when the other processors are loading data to the same cache line, a Z1 read is issued on the system bus. When the first processor snoops the Z1 read requests on the system bus, the first processor issues a lock to one of the requesting processors (in the preferred embodiment, the first request that is received is selected), and then signals a "use super-coherent data" response to all the other requests. The selected processor receives a "use new data" (or lock acquired) response and is later given the lock on the modified cache line. The cache line is then acquired by the selected processor when the first processor issues a DClaim of the cache line on the system bus.

In one embodiment, the Z1 and Z2 states are maintained within a separate Z1/Z2 directory associated with the main cache directory. The Z1/Z2 directory stores a copy of cache line addresses/address tags for cache lines that are in the Z1 or Z2 state and tracks which of the two states the cache line is in. Processor requests are sent to the Z1/Z2 directory simultaneously with the main directory. Although this only allows a small amount of the main directory to be in the Z1/Z2 states, it provides an easy mechanism to quickly clear the Z1/Z2 cache states. One could implement the Z1/Z2 states in the main cache directory, but whenever all of the Z1/Z2 cache states need to be cleared, significant directory bandwidth may be consumed.

The coherency state of all the other processors that receive the "use super-coherent data" response is set to Z2, and the other processors with the cache line in the Z2 state operate with the super-coherent data until the Z2 state changes. In the preferred embodiment, the other processors continue to utilize the super-coherent data until the processor goes to the system bus to complete an operation and then issues a barrier instruction. When this sequence of events occur, the coherency state of all the cache lines within the cache that were in a Z1 or Z2 states is automatically changed to reflect the I state. Where the Z1 and Z2 states are stored in a Z1/Z2 directory, this operation is completed as a flush (or invalidate) of all contents of the Z1/Z2 directory.

Monitoring the occurrence of the above sequence of events is made easier by providing a clear_on_barrier_flag (COBF) associated with the Z1/Z2 directory which is set whenever a processor operation is issued to the system bus. Thus, if a barrier instruction is encountered while the COBF is set, the entire Z1/Z2 directory is immediately flushed (or invalidated), and the coherency state of the corresponding cache lines is read from the main directory where they are stored with an I state.

In another embodiment, additional system optimizations are provided, including, for example, read operations with specific directives. Enhanced reads (or read requests) are provided with added bit(s). The bit(s) indicates whether the read may be completed with super-coherent data or only with coherent data if the data is in an I, Z1, or Z2 state. The enhanced read may also be utilized in embodiments without the new cache states, but is preferably utilized with embodiments in which the new cache states are provided. Additionally, a specialized store instruction with additional bits is provided for utilization by a processor with a cache line in the modified state who wishes to release the lock on the cache line to a next processor whose cache line may be in the Z2 state. When the bits are set, issuing the store instruction to the system bus triggers the next processor(s) to change its coherency state from Z2 to Z1. A Z1 read is issued and the Z1 read is provided a lock on the cache line. Notably, the coherency state of the cache line of the issuing processor following the release of the lock store operation goes from M to I (and not S), while the coherency state of the cache line of the requesting processor changes from Z2 to Z1 to M.

In a data processing system having shared caches among processor groups, additional coherency states are utilized to reflect processor specific Z1/Z2 states within the Z1/Z2 directory. Each Z2 state then signals a specific processor to utilize previously coherent data while other processors within the group may still issue Z1 reads out to the system bus. When a next processor sharing the cache desires to access the cache line, the next processor issues a system bus read for that cache line, and if a "use super-coherent data" response is received, then that processor will also be provided a Z2 designation for cache line access and thereafter utilize the super-coherent data. Also, if a lock is acquired by any one of the processors, the subsequent modification of the cache line for that processor forces a group change of the Z1/Z2 cache states to reflect the new state (e.g., M).

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1A:
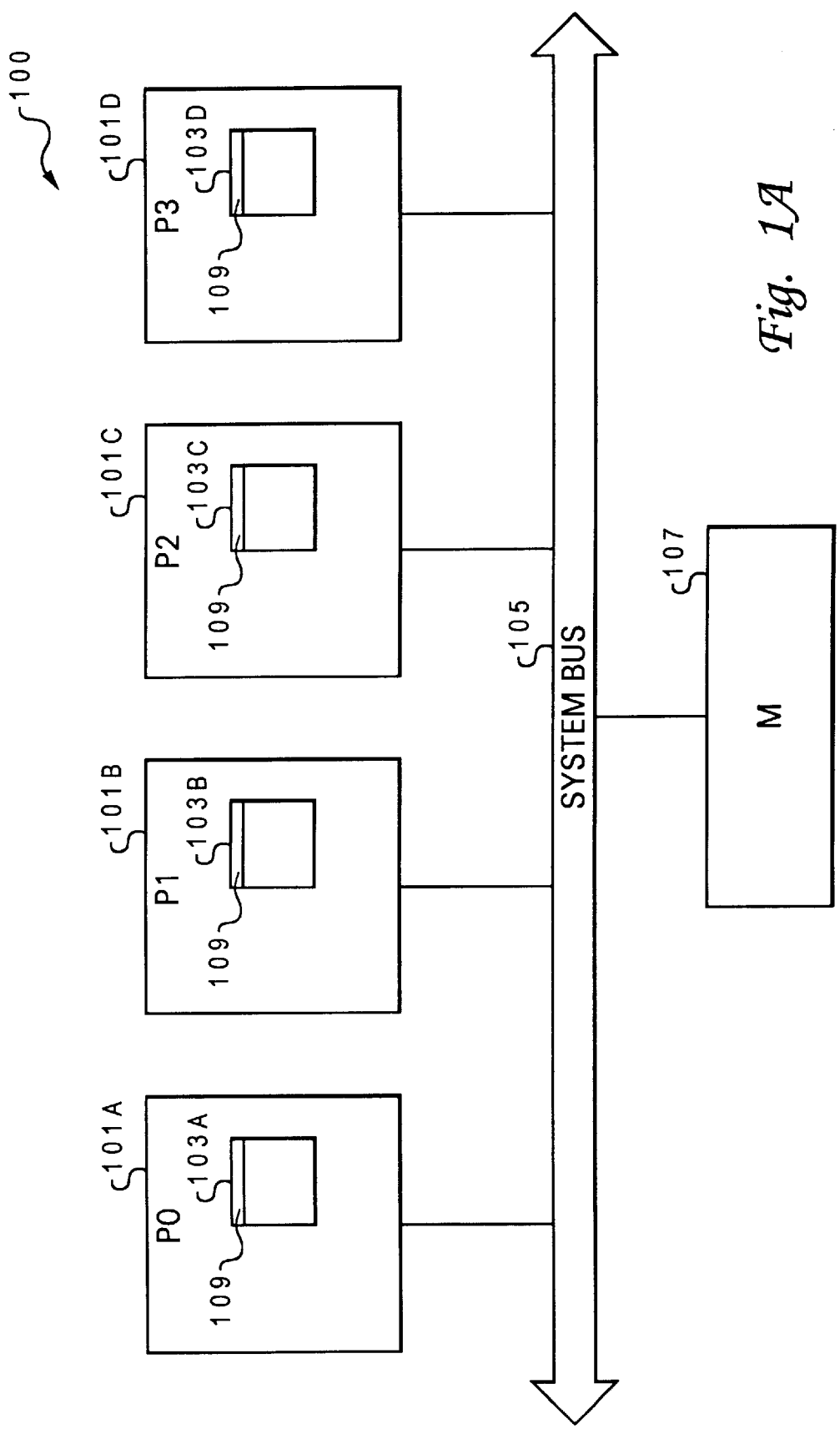
FIG. 1A is a block diagram of a 4-way multiprocessor computer system.
Figure 1B:
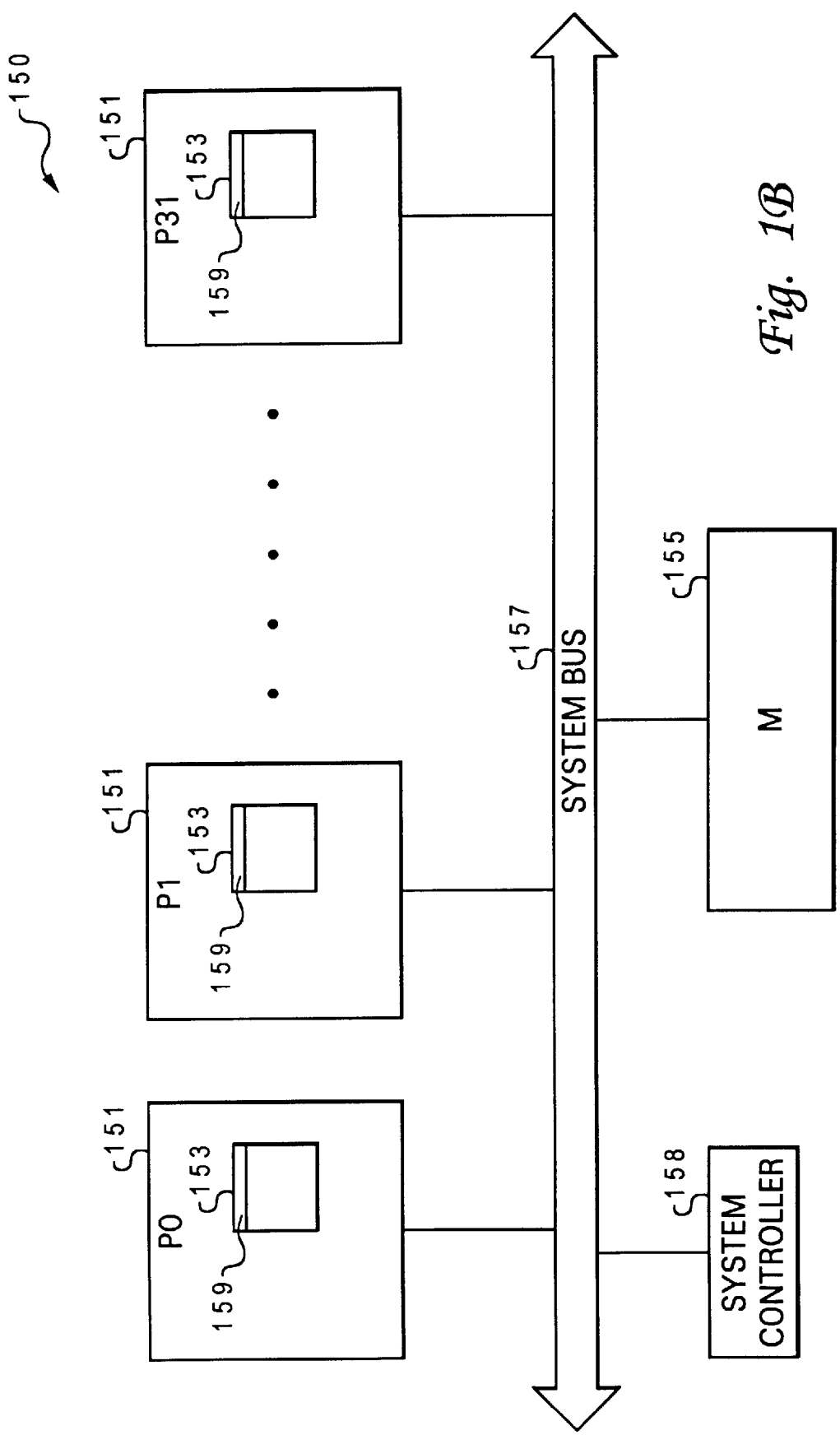
FIG. 1B is a block diagram of a larger (32-way) multiprocessor computer system in which some features of the present invention may be implemented.

Referring now to the figures and in particular FIG. 1B, there is illustrated one embodiment of a multiprocessor computer system 151 having 32 processors, each comprising a processor core, and local cache 153 that includes a shared cache line 159. Multiprocessor computer system 150 further includes an interconnect (or system bus) 157 on which processor transactions are issued and snooped, and a memory 155. Multiprocessor computer system 150 may also comprise at least one lower level (L2, L3, etc) cache, although the exact cache hierarchy is not important to the overall operation of the invention. As utilized within one preferred implementation of the invention, multiprocessor computer system 150 also comprises a system controller 158 coupled to the system bus. System controller 158 is a logic block, which may include software logic, that operates as a system bus arbiter, system memory controller, etc. Multiprocessor computer system 150 further comprises an operating system (OS), expanded cache coherency protocol, system bus protocol, and other hardware, firmware, and/or software components required for the correct implementation of the present invention.

The present invention is directed to a method of implementing cache coherency operations in a multi-processor computer system, such as the system of FIG. 1B, but the present invention could be applied to computer systems with different hardware configurations. For example, the computer system may comprise a switch-based interconnect rather than the system bus illustrated in FIG. 1B.

Figure 1C:
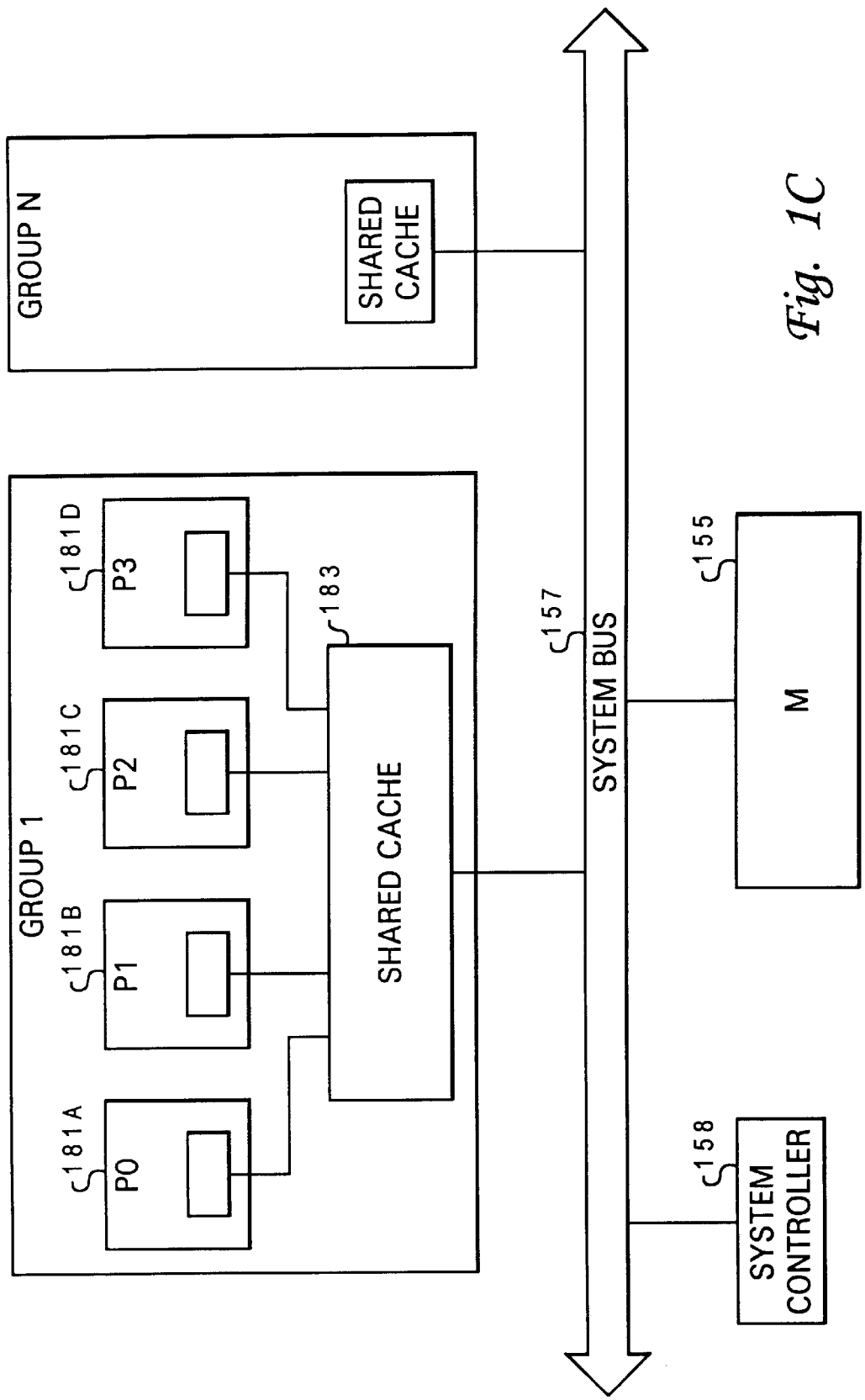
FIG. 1C is a block diagram of one 4-way processor cluster, having a shared cache configuration in accordance with one embodiment of the present invention.

Additionally, one embodiment of the invention is directly applicable to a multiprocessor configuration comprised of processor clusters with shared caches. FIG. 1C illustrates this configuration. Unlike FIG. 1A, processors 181A–181D are coupled to shared cache 183, which has an associated cache directory. Application of the features of the invention to this configuration is described in detail below.

The improved method of the present invention, which relates generally to coherency states of cache lines, is particularly directed to the handling of processor/system coherency responses following a modification of a shared cache line in a cache of one processor among multiple interconnected processors. The modification may, for example, be triggered by a PowerPC™ DClaim bus transaction or a RWITM operation. The present invention is equally applicable to similar operations which may be implemented to modify data in a cache line, and any reference to a specific cache operation should not be construed as limiting on the invention. Also, as will become apparent, the present invention may be utilized at any cache level(s) in a multi-level cache architecture (L1, L2, L3, etc.), which support coherency operations with values in a shared state with a cache of another processor. Furthermore, the present invention may be utilized in multiprocessor computer systems other than symmetric multi-processor (SMP) systems; for example, the invention could be applied to a non-uniform memory access (NUMA) system wherein the system memory (RAM) is divided among two or more memory arrays (having separate memory controllers connected to the system bus) and allocated among the processing units.

As discussed in the Description of Related Art, conventional cache coherency protocols are somewhat inefficient in their handling of a processor-cache coherency response to the issuing of a store operation directed to a shared cache line of one of the processor caches. The present invention reduces the instances of retries issued on the system bus, allowing continuing execution by processors without the wait required to acquire a lock on the cache line in order to update the local cache data, free up system bus bandwidth for other operations, and generally increases processor efficiency. The invention is applicable to other coherency operations, i.e., not just ones involved in multiple lock acquisition processes, and the invention may be extended to any processing operation in which there are lots of data moving around unnecessarily. To simplify understanding of the invention, the illustrated embodiment(s) is described with specific reference to lock acquisition. Thus, the illustrated embodiment follows asynchronous lock acquisition and helps to mitigate over-utilization of the system bus and reduce processing delays incurred while waiting on serial propagation of updates of a cache line to each processor's cache. Aside from lock acquisitions, the invention finds applicability to modifications of data in an SMP environment, in general.

Specifically the invention provides the following:

(1) a data processing system with significantly reduced system level address and data operations against highly contested modified cache lines, via utilization of a super-coherent data and processing characteristics.

(2) an SMP system bus protocol that provides a set of additional processor/cache address operations and snoop responses to the receipt of a request from a second processor for a read on a cache line that has been modified within the first processor's cache, whereby address and data operations against a highly contested modified cache line is substantially reduced;

(3A) a coherency protocol that includes at least two functional states, (referred to herein as the Z1 and Z2 states), which collectively enables cache coherent microprocessors to utilized super-coherent cache data (also referred to herein as "old" or "previously coherent" data);

(3B) an affiliated Z1/Z2 directory that provides a processor with efficient determination of and direct access to cache lines that are in the Z1 or Z2 states (i.e., identifying the address of the requested data) to facilitate the operation of items 1, 2, and 3A above;

(4) hardware and/or software mechanisms that provide performance optimizations for super-coherent SMP systems, including a dynamic data bus bandwidth controller and ISA enhancements to load and store instructions; and (5) an extended coherency protocol for a multiprocessor system with a shared cache configuration that includes processor specific coherency states related to utilization of super-coherent cache data.

As utilized herein the term super-coherent (cache) data (or previously coherent data) refers to unmodified (or still to be modified) data present in a cache line shared with other processor caches, when the cache line has been modified in a cache of another processor. According to the preferred embodiment, super-coherent data may be utilized within processes carried out by the local processor until the local processor tries to modifies the cash line or the local processor issues a bus translation followed by a barrier instruction. Super-coherent data may only be utilized by the local processor and is immediately flushed (or invalidated) when particular system bus operations occur, as described below. According to the preferred embodiment of the invention, super-coherent data are represented via a set of cache states and supporting coherency protocols, namely the Z1 and Z2 cache coherency states.

The independent operation of processors in existing multiprocessor systems allows the local processors to continue operation with local data irregardless of the modifications that occur to shared lines in another processor cache. With the complexity of today's processing system extending to allow independent operation of each processor or processor group, (i.e., one processor may complete its operations completely independent of another processor), correct operation may be completed without synchronizing coherency in a lock-step manner. To provide necessary synchronization of processes, the multiprocessor system utilizes a system-wide barrier operation to ensure correct processing. Since the combination of a bus transaction followed by a barrier operation by the same processor is infrequent (several thousands of instructions), significant processing may be completed on each local processor before the cache data coherency operations need to be completed.

A. "Z1" and "Z2" Cache Coherency States

Figure 2:
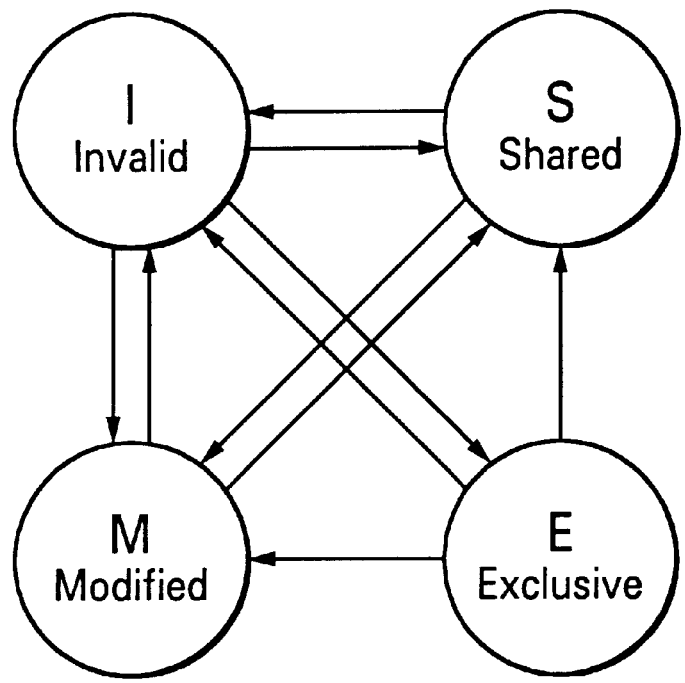
FIG. 2 is a state diagram depicting a prior art cache coherency protocol (MESI)
Figure 3:
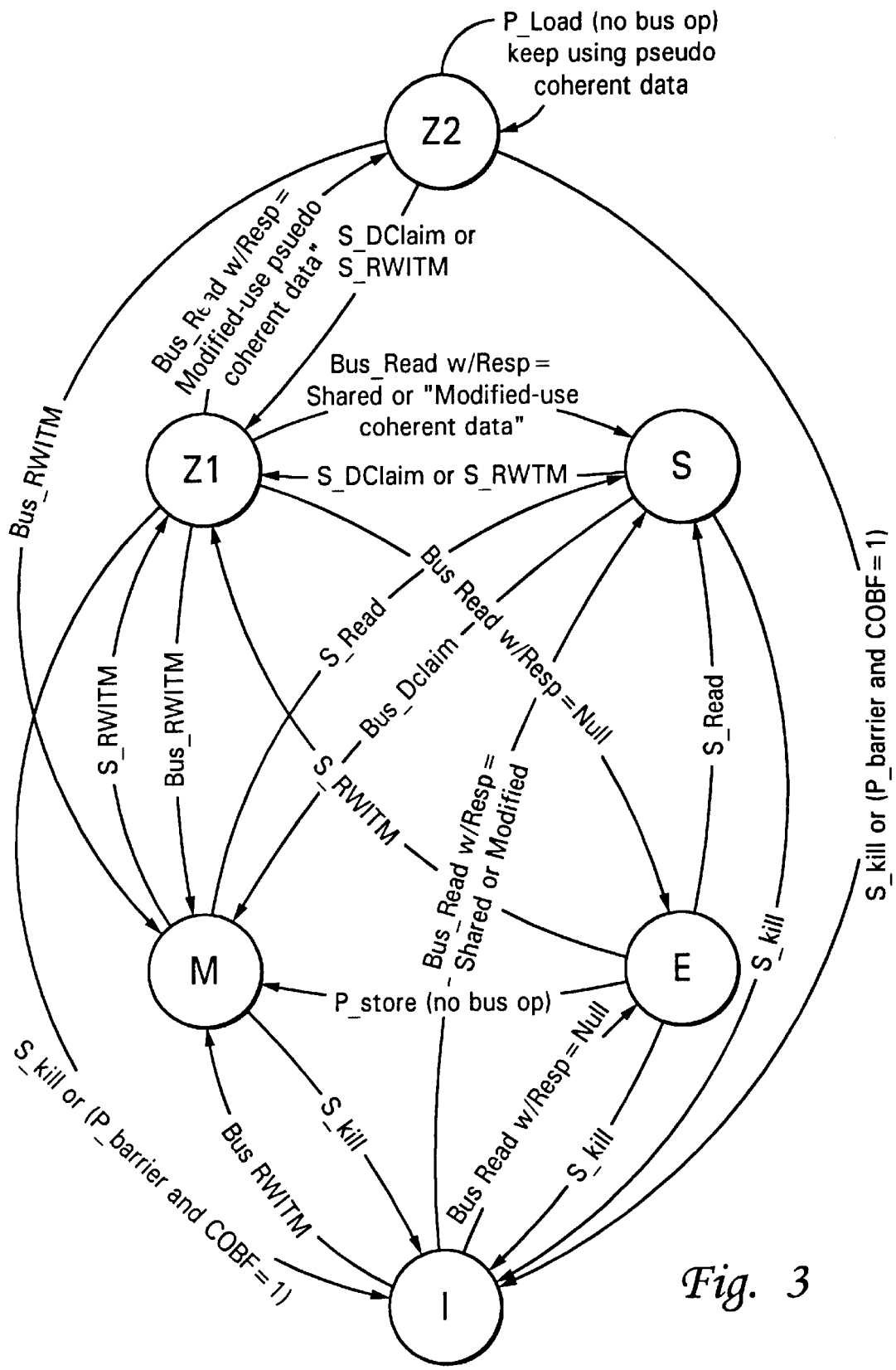
FIG. 3 is a state diagram depicting a new cache coherency protocol in accordance with a preferred embodiment of the present invention.

With reference now to FIG. 3, there is depicted a state diagram of one embodiment of a cache coherency protocol according to the present invention. In addition to the coherency states of the traditional MESI (Modified, Exclusive, Shared and Invalid) protocol of FIG. 2, the expanded coherency protocol of the invention comprises two additional states that are linked in operation to the other states of the MESI protocol. These two coherency states operate to direct processor execution related to issued operations requesting a specific shared cache line, whose data has been modified in another cache The first of the two states is the "Z1" state, which indicates that: (1) a modification to the cache line's data in another processor's cache has been snooped and (2) the subsequent processor request for that cache line will be issued as an "Z1 Read" system bus operation and, depending on the response received from the bus unit controllers, the local cache line data may be utilized although it is "super-coherent" (or "old"). The Z1 Read system bus operation may be a read request having an appended flag indicating it is a read from a local cache line in a Z1 state.

The Z1 state is a temporary state immediately assigned to a cache line of a snooping processor when a store (or other request that results in modification) to a shared cache line in another processor's cache is snooped on the system bus. The Z1 state indicates to the local processor that the processor should issue a Z1 Read request in an attempt to "weakly" acquire the modified cache line. Additionally, the Z1 state alerts the processor that if a "use super-coherent data" response is received, then super coherent data will thereafter be sent to the processor until a condition that causes a change to the cache line's coherency state occurs.

In operational terms, a Z1 state directs the type of read request to issue to the system bus. When a Z1 state is encountered, the processor interprets it as a directive to issue a Z1 read and look for one of the three possible responses (retry, use super-coherent data, or use coherent data (lock acquired)).

The second of the two states is the "Z2" state, which indicates that the processor read should utilize the data currently in the cache line although that data may have been modified in another cache and not yet updated in the present cache. The Z2 state tells the processor to use the super-coherent (previously coherent) data rather than continually go to the system bus to attempt to acquire the modified data.

The Z2 state transitions from the Z1 state following a "use super-coherent data" response to the Z1 Read. When the cache line is in the Z2 state, the local processor continues utilizing the previously coherent data until a particular sequence of events occurs. Thus, the Z2 state informs the processor that the data may be non-coherent with respect to other processor caches but still cache coherent with respect to the instruction execution stream. The Z2 state also indicates that the previously coherent data may continue to be provided to and utilized by the processor until the local processor issues a barrier instruction following a processor operation that is issued on the system bus, as described in further detail below.

B. New System Bus Transactions

The utilization and operation of the Z1 and Z2 states requires several new responses (i.e., in addition to the traditional responses) to support the cache coherency protocol, including one internal processor-cache controller response and two snoop responses to a Z1 read. The traditional responses are also present including, for example, a "null" response, which indicates that the modified cache line has been written to memory and the requested data must be retrieved from the system memory.

The first new response is an internal cache read response within the local processor that signals "use the cache line, although I have super-coherent data" and is associated with a read request that encounters a cache line of the local cache in the Z2 state.

The second new operation response is a system level "use super-coherent data" response issued on the system bus and which triggers the transition from the Z1 to the Z2 state in the processor receiving the response. This second response is received in response to a Z1 read and is a response issued by the processor (snooper) that owns (i.e., has the lock on) the modified cache line.

The third new response is "use new (or coherent) data" (i.e., lock acquired), which is also a system level response, and is also issued on the system bus to a requesting processor in response to a Z1 read. When a "use coherent data" response is received, the cache state in the requesting processor's cache changes to S and the cache line receives a copy of the modified data from the processor/cache that issued the response. The issuing processor (of the response) transfers the lock within the modified cache line to the requesting processor.

In contrast with the Invalid (I) state, which allows unsuccessful read requests issued to the system bus to be continually re-issued until data is obtained Z1 reads are usually only issued once. Although a Z1 read may get retried, the probability of retry is significantly reduced since the snooper can allow the requesting processor to utilize its super-coherent (old) data by issuing the appropriate system bus response.

According to the preferred embodiment, the issuing processor transfers the lock to only one of several requesting processors (however, the invention contemplates another coherency mechanism wherein more than one lock may be provided simultaneously, as in a multi-node system), then the processor issues a response indicating that new coherent data will be sent. Accordingly, the receipt of a "use super-coherent data" response by a processor implies that the lock is not being provided to that processor. In the 32-way system of FIG. 1B, for example, a single "use new data" response is issued and 30 "use super-coherent data" responses are issued.

When the use super-coherent data response is received at the requesting processor, the coherency state of the cache line transitions from Z1 to Z2. The change to the coherency state indicates the read request has been issued to the bus and an authorization to use the local data was received.

In one embodiment, when the processor acquires a lock via "use coherent data," the associated Z1 state transitions to S. Notably, however, when a null response is received in response to a Z1 Read, the processor may later acquire the lock and the associated Z1 state transitions to E.

C. Cache Operations and Coherency State Transitions

Transitions among the cache states occur following a receipt of one of several operations, which are tabulated below. Operations received at the cache may be from the processor (i.e., processor (P) operations) or from the system bus (i.e., snooped (S) operations).

TABLE A

| SYSTEM (Snooped) OPERATIONS | Shortened Form |
| --- | --- |
| Snooped Read | S_Rd or S_Read |
| Snooped Read With Intent To Modify (RWITM) | S_RWITM |
| Snooped DClaim | S_DClaim |
| Snooped Kill (I/O cache line write or cache line kill instruction by software) | S_Kill |
| PROCESSOR OPERATIONS | |
| Processor Load (Instruction fetch, Data (D) load, TLB load) | P_Ld or P_Load |
| Processor Ld operations may result in a bus read | Bus Read |
| Processor Store (Data (D) stores and TLB updates) | P_St or P_Store |
| Processor St operations may result in a Bus DClaim or Bus RWITM | Bus DClaim Bus RWITM |
| Processor Barrier Operation | P_Barrier |

The directional lines of the state diagram of FIG. 3 indicates which operations triggers the transitions among the coherency states. Table B below summarizes these transitions.

TABLE B

| | From | | | | | |
|---|---|---|---|---|---|---|
| To | M | E | S | I | Z1 | Z2 |
| M | X | P_Store | Bus DClaim | Bus RWITM | Bus RWITM | Bus RWITM |
| E | X | X | X | Bus Rd w/ Resp = null | Bus Rd w/ Resp = null | X |
| S | S_Read | S_Read | X | Bus Read w/ Resp = Shared or Modified | Bus Read w/Resp = Modified, use new data | X |
| I | S_Kill | S_Kill | S_Kill | X | S_Kill or (COBF and P_Barrier) | S_Kill or (COBF and P_Barrier) |
| Z1 | S_RWITM | S_RWITM | S_DClaim or S_RWITM | X | X | S_DClaim or S_RWITM |
| Z2 | X | X | X | X | Bus Read w/Resp = modified, use old data | P_load |

Several transitions are marked with an X indicating that no change of state occurs for the operations specified in table A. Also operations for which state updates (i.e., M to M) occur are also marked X (although the Z2—Z2 state transition is explicitly shown for ease of understanding). It is understood however, the presentation of specific operations and/or transitions are not meant to be limiting on the invention as other transitions among states, via other operations may be possible and therefore falls within the scope of the invention. For example, Z1 and Z2 may transition to I upon victimizations of the Z1/Z2 directory. Also, S may transition to E based on an address only "cache query" system bus transaction with a "null" response. The invention however focuses on the transitions to and from the Z1 and Z2 states and these operations and transitions are described below.

The transitions to the Z1 state occurs when: (1) a cache line in the M state or the E state snoops a RWITM operation; (2) a cache line in the S state snoops a DClaim or a RWITM operation; or (3) a cache line in the Z2 state snoops a DClaim or a RWITM operation.

Only the Z1 state may transition to the Z2 state. The Z1 state transitions to the Z2 state when a system bus Z1 read is issued and receives a "modified, use super-coherent data" response. Thus the processor executes a read request and, because the cache line is in the Z1 state, a Z1 Read is issued to the system bus. When the response to the Z1 Read is "modified, use super-coherent data," the cache line automatically changes state from Z1 to Z2. The previously coherent data in the cache line is then provided to the processor's instruction stream and execution units.

According to the preferred embodiment, the Z1 state may also transition to the M state under certain specific conditions, namely, the acquiring by the local processor of a lock on the cache line being requested. In one embodiment, the cache coherency protocol allows a transition from Z2 back to Z1. This occurs when a DClaim or RWITM is snooped for a cache line that is already in the Z2 state. This allows the processor to reissue a Z1 Read and have an opportunity to get the lock (Response="Modified, use new (coherent) data").

One implementation of the transition among the Z1, Z2, and other states during processor/cache operations is described in the following operational flow, with reference to the multiprocessor system of FIG. 1B. A lock is acquired by P0, and when the store operation is snooped, the cache states of the corresponding cache lines of the other (snooping) processors P1–P31 changes from S state to Z1, and the snooping processors P1–P31 each issues a Z1 read (i.e., a read requesting a response of either "use super-coherent data" or "use coherent data") to the system bus. P0 snoops the read requests and issues a response to each read request. If the response is "use coherent data," then the processor waits for the new data, and sets the cache state to S. If the response is "use super-coherent data" then the processor uses its local cache data and sets cache state to Z2.

In the FIG. 1B implementation, assuming P1 receives a "use coherent data" response, the coherency state of the associated cache line changes from Z1 to S, P0 changes state from M to S. P1 eventually issues a DClaim of the cache line to acquire the lock.

Simultaneously with P1 being issued a "use coherent data" response, the other processors P2–P31 are issued a "use super-coherent data" response. P2–P31 are effectively told to utilize the copy of the data in their local cache and not to issue a retry on the system bus for the data. Thus, while a lock is being acquired by the processor P1, the other processors are simultaneously, or soon thereafter, told/authorized to use their previously coherent data. P2–P31 change their associated coherency states from Z1 to Z2, and processors P2–P31 utilize the local/cached copy of the data for processing.

The processors (P2–P31) each issue a single read to the system bus when the cache line is in the Z1 state. The Z2 state indicates to the processor that the local data may be incorrect with respect to previous modifications of the cache line in other caches, but allows the local processor to continue utilizing the local data. When the processor later receives another read request for that cache line, the Z2 state, causes the super-coherent data in the cache line to be sent to the processor and no read request is sent out to the system bus. Notably, although only the local processor utilizes data which is in a Z2 state, references to the "local processor," according to the current embodiment, may be extended to include multiple processors clusters/groups having a shared cache as described below.

Thus, whenever the local processor encounters a read request in its instruction stream, the local processor first issues the read to its local cache, and the coherency state of the cache line with a matching address is checked. If the coherency state is Z2, then the local processor is provided with the data in the cache line (even though it is only "super-coherent"). If the coherency state is I or Z1, then the processor goes out to the system bus or lower level cache for the data. However, no retries are issued from the snooper who has the lock when the coherency state of the requesting processor is in the Z1 state (although retries due to standard operating contentions are provided). Of course, as with normal processor-cache operation, a read request is also issued to the system bus whenever the processor's cache does not contain the cache line (i.e., a cache miss occurs).

In one embodiment, the above process is controlled by the processing logic which controls cache access rights. The processing logic is programmed to recognize the additional two cache states in the coherency protocol and respond accordingly. The bus control unit or bus fabric transmits the Z1 Read to the cache that has the data in a modified state. The bus control unit forwards the response (either a "use new data" or "use super-coherent data") to the requesting processor.

D. Hardware/Software Considerations

I. Z1/Z2 Directory

Figure 4:
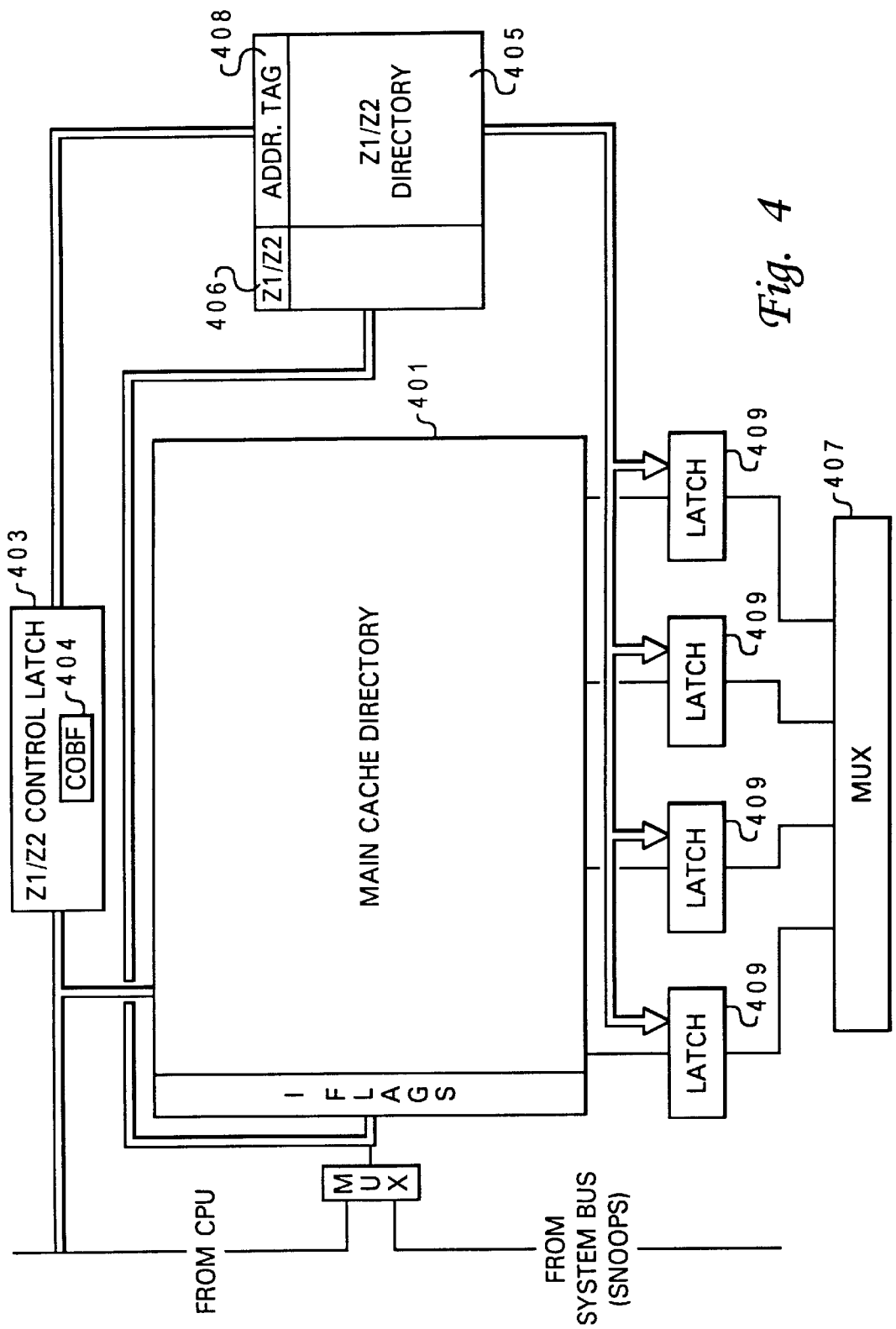
FIG. 4 is a block diagram of one embodiment of a cache configuration with an associated Z1/Z2 directory according to one embodiment of the present invention.

Because the caches are very large, the corresponding cache directories are also large and may contain a large number of cache lines only some of which are in the Z1 or Z2 state. In order to control the state changes for the cache lines in the Z1 and Z2 state without necessarily having to search through the entire directory for each state transition, a separate Z1/Z2 directory is provided in the preferred embodiment. FIG. 4 illustrates a cache directory with associated Z1/Z2 directory according to one embodiment. Z1/Z2 directory 405 is coupled in parallel to main (cache) directory 401. Access to Z1/Z2 directory 405 is controlled by a control latch 403, which, in the illustrative embodiment, includes a Clear_On_Barrier_Flag (COBF) 404. As explained further below, the COBF is utilized to monitor conditions that enabled the Z1 and/or Z2 states to transition to I. In an alternate embodiment, the COBF 404 is housed within the Z1/Z2 directory 405.

Z1/Z2 directory 405 preferably operates as a First-In-First-Out memory block. In the preferred embodiment, Z1/Z2 directory 405 contains a copy of the addresses or address tags 408 of the cache lines in the Z1 or Z2 state as well as a number of state bits 406 to indicate whether the cache line is in the Z1 or Z2 state. Z1/Z2 directory 405 receives a copy of each cache line's address tag as soon as the cache line is set to Z1 during system processing. A copy of the cache line (address tag) is maintained within the main directory 401. However, according to the preferred embodiment, cache lines in the Z1 or Z2 states are represented in the main directory 401 in the I state. Any operation that later requests the cache line, is sent to both the main directory 401 and the Z1/Z2 directory 405.

The address tags that are sent to Z1/Z2 directory 405 are determined by the control latch 403, which is logic that receives information on whether a particular cache line is being placed in the Z1 state. The operations that result in the cache state transition from Z1 to Z2 are supported by additional logic controlling the Z1/Z2 cache. Once the use super-coherent data response is received, the response is sent to the logic of the Z1/Z2 directory 405, and the Z1 state for that address tag is changed to Z2. Simultaneously, the cache controller triggers the cache to release the data from the local cache line to be returned to the processor execution unit requiring the data.

If the number of address tags in the Z1 and Z2 states exceeds the size of the Z1/Z2 directory 405, then the address tag(s) at the bottom of the Z1/Z2 directory 405 (i.e., the first in) is flushed out, and directory logic causes the cache line to be seen in the I state within the main directory 401. This process involves utilization of a series of latches 409 and a multiplexer (MUX) 407 coupled to the main directory 401. When an "Z1/Z2 kill" is received by the processor (or any other condition which causes a changed from a Z2 state to I), the processor does not have to search through the entire main directory 401 to effectuate the changes. Rather the address tags within the Z1/Z2 directory 405 are flushed out (or invalidated) leaving the cache lines in the main directory with I coherency states.

In one alternate embodiment, each address line in the main directory 401 (and the Z1 I/Z2 directory 405) is provided with a single bit flag, which may be set "valid" (e.g., a value of 1) or "invalid" (e.g., a value of 0). Whenever a cache line is valid in the Z1/Z2 directory 405, that cache line is invalid in the main directory 401 and vice versa. This allows a single cache state (Z1, Z2, or I) to be set for the cache line within the combined directories at any one time. A Z1 or Z2 state is thus indicated in the main directory 401 as an I state with the cache line marked invalid. Whenever an operation is completed that causes the cache line to go to the Z1 state, the cache controller logic immediately changes the cache line coherency state in the main directory 401 to I, with the flag set to invalid. Simultaneously with this operation, the address tag of the cache line is copied into the Z1/Z2 directory 405 with its flag set valid. When the Z1/Z2 directory 405 is flushed, the flags within the Z1/Z2 directory 404 are set to invalid, while the corresponding flags in the main directory are set valid. In this manner a seamless transition from Z1 or Z2 to I is made possible.

E. Z1 and Z2 to I State Changes (Triggers)

The sequential occurrence of a combination of events operates as a trigger to force the Z1 state and Z2 state to transition to the I state. The state change occurs whenever the local processor goes out to the system bus to complete an operation and then issues a barrier instruction. Specifically, the local processor may execute a "Z1/Z2 kill" operation, i.e., a store to a non-modified cache line or any operation that modifies storage that is not on the local cache, followed by a barrier instruction. When this condition occurs, all the cache lines in the Z1 or Z2 state must be located and "killed" (i.e., the cache state change to I). Notably, according to established coherency protocols, only data being transferred from one cache to another cache effects changes to the Z1 and Z2 state (i.e., data transfer to and from memory does not affect the coherency states). Also, a processor issued operation (IFetch, Dload or TLB load) may result in a cache state of Invalid if the bus read misses at the cache, i.e., the cache line is not present in the cache and thus there is no previously coherent data.

This operation is made simpler by the utilization of the separate Z1/Z2 directory, which allows a complete flush of all Z1/Z2 coherency states via an invalid bit. When applied to the Z1/Z2 directory configuration, the transition requires a two stage operation that is monitored. In the preferred embodiment, a flag (referred to herein as clear_on_barrier_flag (COBF)) is provided within the control logic of the Z1/Z2 directory or within the directory itself. The COBF is automatically set (e.g., value=1) for any processor operation that is issued to the system bus. Four major operations trigger the setting of the COBF. These operations are: (1) a Bus Read with Response="Modified, use coherent data"; (2) Bus Read with Response="Null (get data from memory)"; (3) Bus DClaim with Response="Shared"; and (4) Bus RWITM.

Whenever a barrier instruction is encountered, the COBF is check. If the COBF is set, occurrence of the barrier instruction causes a complete flush (invalidation) of the Z1/Z2 directory. The value of the valid bits in the Z1/Z2 directory are all set to zero, indicating that no valid address tag is present in the Z1/Z2 directory. As a part of the flush operation, the main directory addresses are made valid, causing all cache lines previously in the Z1/Z2 state to be immediately seen by the processor as being in the I state. Also, following this flush operation, the COBF is reset.

The directory logic monitors for occurrence of an instruction (from the instruction stream) that is a global kill instruction or which causes a processor operation that results in a cache miss and/or causes the processor to go out to the system bus. Whenever an instruction fitting this description is encountered, the COBF is set. The directory controller monitors for a receipt by the processor of a barrier instruction. If a barrier instruction is received while the COBF is set, all the Z1 and Z2 states are changed to I (all cache lines in a Z1 or Z2 state within the local cache are "killed"). This forces any further requests for that data to go out to the system bus to acquire the data, either from memory or another cache.

Thus, in summary, Z1 and/or Z2 changes to I if: (1) the local processor issues "kill" bus transaction followed by a barrier operation; or (2) if the local processor goes to system bus to complete an operation (e.g., a load which either misses the cache or hits an I in the cache, i.e., a tag miss or a tag hit but which has an I cache state) followed by a barrier operation.

F. Hardware/Software Performance Optimizations
I. Hardware Optimizations

The bus control unit or bus fabric is responsible for transmitting the read to the cache that has the data in a modified state. When the cache responds to the read by issuing either a "use coherent data" or "use super-coherent data" response on the system bus, the bus control unit also forwards the response to the requesting processor.

According to one embodiment, the system controller of the data processing system (which typically includes the bus control unit) monitors the system operation characteristics (i.e., the address and data bus utilization) and throttles the operations on the buses based on the monitored bandwidth utilization. Whenever the system controller determines that the address or data bandwidth is below a pre-established threshold value (e.g., 60% utilization of bus resources), the system controller may dynamically override and/or change the cache response mechanisms for a snooping processor. Specifically, the system controller may force the snooping processor to respond with "use coherent data" or "retry" to more than one of the requesting Z1 Reads, thus enabling multiple retries from some or all of the requesting processors. Likewise, when the bus utilization is above a pre-established threshold value (e.g., 90%) the system controller may prevent the snooping processor from issuing a "use coherent data" response to any of the requesting processors. In effect, the system controller changes any "use coherent data" response that may be issued by the snooping processor to a "use super-coherent data" response so as not to further congest the data (or address) bus.

An extension of the hardware optimization is provided via the control logic for the Z1/Z2 directory, which operates responsive to signals received from the system controller. These signals include a signal indicating when the address or data bus utilization is above or below a pre-established threshold. If more data bandwidth is available, then the system controller triggers the Z1/Z2 directory logic to force the Z2 state to go back to the Z1 state and thus force the issuance of corresponding Z1 Reads on the system bus. This increases the number of operations on the address bus and ultimately the flow of data on the data bus. The change from Z2 to Z1 may be completed on all processors for all cache lines in the Z2 state or on a selected number of processors or selected cache lines based on the available bandwidth. The system controller is able to monitor the bandwidth usage to downgrade a "use coherent data" response to "use super-coherent data" response, when necessary. In this manner, the system controller operates to provide near optimum utilization of the address and data busses (i.e., near 100% utilization for maximum performance).

II. Software Optimizations
II(A). Loads With Bit Extensions

Architectural extensions are provided via mode bits and additional dynamic hardware facilities to support the cache states and state transitions. In one embodiment, changes to the instruction set architecture (ISA) are implemented to exploit the utilization of super-coherent data. The inherent performance optimizations are realized with the logic design determination of when to utilize super-coherent data based on current bus activity. With the bit extensions, the invention allows simple load requests to implement the performance benefit of allowing continuing local processor execution regardless of whether or not the local processor acquired a lock on a requested cache line following a modification at another processor cache.

Thus, in one preferred implementation, the invention provides a modified read/load operation that taps into the functionality of the Z1 and Z2 coherency states. Specifically, a two bit flag is added to each load request. When set (e.g., first bit value=1), the first bit indicates that the load request may utilize either super-coherent/local data or new data. Otherwise (i.e., when first bit value=0), the load request must load only new or coherent data. When the first bit is set, the value of the second bit tells the processor to monitor the current bus utilization to decide whether to arbitrate for new data. That is, if the value is set (1), then the load request will utilize new data if the address and/or data buses are not very busy.

Figure 6:
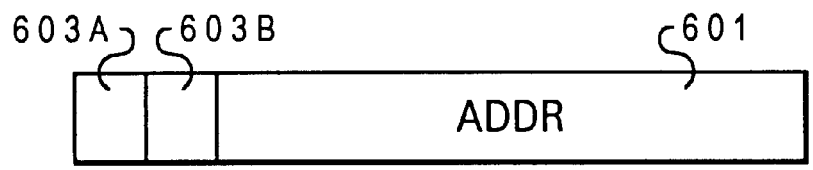
FIG. 6 is a read instruction with additional bits indicating coherency triggers within the read operation in accordance with one embodiment of the invention.

FIG. 6 illustrates an example 32 bit load (read) instruction with address bits 601 and two bit flag, with first bit 603A, and second bit 603B. With this 2 bit extension, the load instruction may be tagged as 00 (may utilize new or old data); 01 (try to utilize new data if data bandwidth is available); or 1X (must utilize new data). In one embodiment, the flag 603A, 603B may be set during program development. Alternatively, additional processing logic may be provided, which monitors processor execution and coherency state changes to determine the value to be placed in the flag just prior to issuing of a read request from the processor. In this embodiment, the processor logic also tracks the Z1s within a cache and when a load is about to be issued determines whether the load should be issued only once to the system bus or whether the load should be retried until a lock is acquired on the cache line. Modifications to the processor logic enables the processor to correctly identify a Z1 and Z2 state and operate or respond accordingly.

Thus, loads are marked to indicate to the cache controller whether only valid data may be utilized or whether previously coherent data may be utilized. Accordingly, the processing logic is aware when the load being completed is a load to synchronize data versus a load to get data.

II(B). Stores With Bit Extensions

The extension to the store instruction preferably consists of 2 bits, which operate exclusive of each other. The store instruction is an address only operation that is issued by the processor that contains the modified data (i.e., the cache line is in M coherency state). The store instruction extensions indicate to the snooping processors whether the store is a regular store or a store which releases the lock on the cache line. Prior to issuing the store instruction on the system bus, the first bit is set by the system controller (or the issuing processor) to indicate that the store instruction is an address operation on the system bus designed to provide a lock to the next processor, whose cache line is in the Z1 or Z2 state. The second bit enables the waking up of the processor caches in the Z2 state from the internalized use of super-coherent data and triggers the resetting of the Z2 states to Z1 state. In one embodiment, the second bit is utilized to indicate an M to I cache state transition for a Z1 read with "use coherent data" response.

When the store instruction is snooped on the system bus with the first bit set, the other processors almost immediately issue a read request on the system bus in an attempt to acquire the lock on the cache line. According to the preferred embodiment, the store instruction with the first bit set triggers the other processor caches (i.e., the directory controllers) to change all Z2 states corresponding to the cache line to Z1 state and subsequently issue a Z1 Read on the system bus.

In the preferred embodiment, once the issuing processor issues the store instruction and enables the lock to another processor, the coherency state of the cache line changes from M to I (unlike the traditional change from M to S following lock acquisition). One of the other processors that issues the Z1 Read then acquires the lock and the corresponding modified data. The processor acquiring the lock changes its coherency state from Z1 to M. (Note: these cache state transitions are not shown in FIG. 3). The other processors that issued a read request and did not acquire the lock, receive a "use super-coherent data" response and the coherency state of their cache line changes back to Z2. The process of releasing the lock via an address transaction on the system bus with first bit set and the associated coherency changes within the processor caches may continue until all processors have received the data Thus the requesting processor realizes that the lock is being released by the store instruction with bit values set and arbitrates to acquire the lock to the cache line in the modified state but without an ensuing DClaim bus transaction.

Although described with specific number of bits providing specific enhancements, the invention contemplates other enhancements via the load and/or store instructions that may be coded with additional bits.

G. Shared-cache Application of Z1 and Z2 States

The features of the invention may be extended to processor clusters (i.e., node-based multiprocessor groups) sharing a common cache, as described above with respect to FIG. 1C. In one such embodiment, the Z2 state may be utilized to represent "use super-coherent data" by all local processors within a particular cluster. In the preferred embodiment, however, processor specific Z2 coherency sub-states, Z2(n), are provided, i.e., a Z2 coherency state is provided in the cache directory that indicates to which specific processor the Z2 state applies. All other functional features described above with the single processor-cache configuration apply equally to the processor cluster with shared cache.

Figures 5A, 5B:
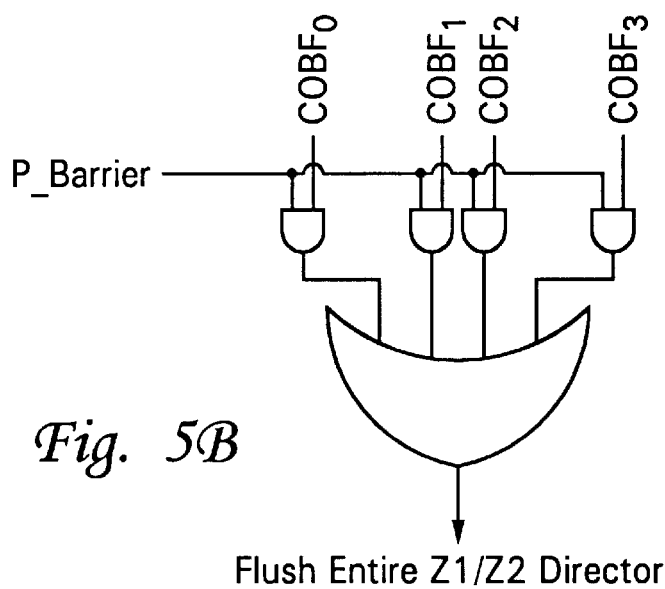
FIG. 5A is a block diagram illustrating the Z1/Z2 cache directory configuration for a shared-cache topology in accordance with one embodiment of the present invention.
FIG. 5B illustrates one implementation of a logic circuit which may be utilized to determine when to flush the Z1/Z2 directory in a shared cache topology in accordance with one embodiment of the present invention.

Thus, the Z1 to Z2 transition with a four processor cluster becomes a transition to Z2(1), Z2(2), Z2(3), and Z2(4) states. The Z2(n) sub-states are independent of each other and may be independently set as illustrated in FIG. 5A.

When processor 1 issues a Z1 read and receives a use previously coherent data response, the coherency state of the cache line changes to reflect that processor 1 thereafter views the cache line as being in the Z2 state (Z2(1)); however from the perspective of processors 2, 3, and 4, the cache line remains in the Z1 state until the processors individually issue a request for the cache line to the system bus and receive a "use super-coherent data" response.

For example, if processor 2 accesses the cache line and encounters the Z2(1) state, the processor 2 request is issued out to the system bus. Processor 2 may then receive either a "use super-coherent data" response or lock acquired response. If a use super-coherent data response is received, processor 2 sets its corresponding cache line's cache coherency state to Z2 (e.g., Z2(2)), indicating that processor 2 will also utilize previously coherent data. However, if a lock is acquired for the data, processor 2 completes a global change of any of the Z2(n) states of that cache line occurs and the coherency state changes to M. Therefore, it is possible for any number of the processors within the cluster to have a Z2 state reflected within the Z1/Z2 cache directory, without affecting the operation and response to the other processors' requests for the cache line or other coherency operations.

The following table C illustrates one embodiment, which provides coded Z2 cache states for a four-processor shared cache. The table assumes that all processors begin at Z1 then transitions independently to Z2 after that.

TABLE C

| Processor | Proc 1 | Proc 2 | Proc 3 | Proc 4 | Code |
|-----------|--------|--------|--------|--------|------|
| Z1 state  | 1      | 1      | 1      | 1      | 0000 |
| Z2 state  | 0      | 0      | 0      | 0      | 0000 |
|           | 1      | 0      | 0      | 0      | 1000 |
|           | 0      | 1      | 0      | 0      | 0100 |
|           | 0      | 0      | 1      | 0      | 0010 |
|           | 0      | 0      | 0      | 1      | 0001 |
|           | 1      | 1      | 0      | 0      | 1100 |
|           | 0      | 1      | 1      | 0      | 0110 |
|           | 0      | 0      | 1      | 1      | 0011 |
|           | 1      | 0      | 1      | 0      | 1010 |
|           | 1      | 0      | 0      | 1      | 1001 |
|           | 0      | 1      | 1      | 0      | 0110 |
|           | 0      | 1      | 0      | 1      | 0101 |
|           | 0      | 0      | 1      | 1      | 0011 |
|           | 1      | 1      | 1      | 0      | 1110 |
|           | 1      | 0      | 1      | 1      | 1011 |
|           | 1      | 1      | 0      | 1      | 1101 |
|           | 0      | 1      | 1      | 1      | 0111 |
|           | 1      | 1      | 1      | 1      | 1111 |

According to the above table, a four bit Z2(n) representation in the Z1/Z2 directory, allows the processors to check respective bits (i.e., processor 1 checks the first bit, processor 2 the second bit, etc.) to determine whether the Z2 state applies to the present processor. Other implementation techniques are possible and are contemplated within the scope of the present invention. For example, in one embodiment illustrated in FIG. 5A, individual coherency bits are maintained in the Z1/Z2 directory 500 for each processor within the four-processor group. Thus no code is utilized and the processor response is solely dependent on the value within it's associated coherency bit.

The sequence of operations that trigger a flush of the Z1/Z2 directory are similar with the shared cache configuration. However, to accommodate the additional processor's, each of which may cause a COBF to be set, a somewhat more complex logic may be required. One possible implementation is provided by FIG. 5B, which illustrates logic gates for ANDing a processor specific COBF with an occurrence of a barrier instruction. According to the logic of FIG. 5B precise processor barrier operations coupled with respective COBFs will cause the entire Z1/Z2 directory to be flushed.

The invention is particularly applicable for the ever expanding multiprocessor systems with large number of independent operating processors (e.g., 128-way SMPs) and which include very large caches (which have evolved from kilobytes (KB) caches to megabyte (MB) caches to gigabyte (GB) caches). Further the introduction of weakly consistent architectures, (e.g., IA64, PowerPC, etc.) causes the significant reduction in the number of barrier operations required to ensure synchronization and proper coherency. For example, current commercial processing workloads typically have barrier instructions every 2000 instructions in the instruction stream, and there is movement in the industry towards placing the barrier instructions every 10,000 instructions.

While the invention has been particularly shown and described with reference to a preferred embodiment, it will be understood by those skilled in the art that various changes in form and detail may be made therein without departing from the spirit and scope of the invention. Various modifications of the disclosed embodiments, as well as alternative embodiments of the invention, will become apparent to persons skilled in the art upon reference to the description of the invention. For example, this protocol can be used with features from other coherency states or protocols other than, or in addition to, those provided herein. It is therefore contemplated that such modifications can be made without departing from the spirit or scope of the present invention as defined in the appended claims.

What is claimed is:

1. A multiprocessor data processing system comprising:
   a first and second processor having an associated first and second cache, respectively, with shared cache lines;
   coupling means for interconnecting said first and second processor;
   a main cache directory affiliated with said first processor and said first cache; and
   a secondary cache directory of said first cache, which contains a subset of cache line addresses from said main cache directory corresponding to cache lines that are in a first or second coherency state, wherein said second coherency state indicates to said first processor that requests issued from said first processor for a cache line whose address is within said secondary directory should utilized data currently available in said first cache and should not be issued on said coupling means.

2. The data processing system of claim 1, further comprising:
   means for snooping a request for data held within a shared cache line on a system bus of said data processing system, wherein said request is issued by a requesting processor and is snooped by a second processor of said data processing system whose cache contains an updated copy of said shared cache line;
   means, responsive to said snooping of said request by said second processor, for issuing a first response on said system bus indicating to the requesting processor that said requesting processor may utilize data currently stored within the shared cache line of a cache of said requesting processor.

3. The data processing system of claim 2, further comprising:
   control logic for forwarding said cache line address in said first coherency state to said secondary directory.

4. The data processing system of claim 3, further comprising:
   control logic for directing a transition from said first coherency state to said second coherency state.

5. The data processing system of claim 4, further comprising:
   a coherency protocol that directs a transition from said first coherency state and said second coherency state to other coherency states defined within said protocol.

6. The data processing system of claim 5, further comprising:
   means, responsive to a receipt of a predetermined condition, for changing said second coherency state to a third coherency state that indicates that said cache line is not valid.

7. The data processing system of claim 4, further comprising:
   a clear on barrier flag (COBF) associated with said secondary directory;
   means for setting said COBF whenever an operation of said first processor is issued to said system bus; and
   means, responsive to a receipt of a barrier instruction at said first processor when said COBF is set, for dynamically flushing all contents of said secondary directory.

8. The data processing system of claim 1, further comprising:
   means for setting a cache line of a first processor to a first coherency state that indicates that modification of data within a shared cache line of a second cache of a second processor has been snooped on a system bus of said data processing system;
   means for issuing a request for said cache line as a Z1 read on a system bus, responsive to said cache line being in said first coherency state;
   means, responsive to a response indicating that said first processor should utilize data currently available within said cache line, for changing said first coherency state to said second coherency state that indicates to said first processor that subsequent request for said cache line should utilize the data within the cache and not be sent to said system bus; and
   means for providing said request with data of said cache line when said cache line indicates said second coherency state.

9. The data processing of claim 8, further comprising:
   means, responsive to a subsequent request for said cache line when said cache line is in said second coherency state, for immediately providing said data within said cache line to said processor.

10. The data processing system of claim 9, further comprising:
    means for monitoring a response to said request; and
    means, when said response indicates that said first processor should utilize new data and that a lock has been acquired for the cache line, for:
       retrying said Z1 read until said shared cache line is provided to said first processor from said second processor; and
       changing said first coherency state to a fourth coherency state when said data is provided to said first processor.

11. The data processing system of claim 1, further comprising means for removing said cache line address from within said secondary directory when said cache line is no longer in said first or second coherency state.

12. The data processing system of claim 11, further comprising a logic component that removes a first entered cache line address out of said secondary directory when a new cache line address is received at said secondary directory while said secondary directory is full.

* * * * *